(12) United States Patent
Iyer

(10) Patent No.: US 6,397,248 B1
(45) Date of Patent: May 28, 2002

(54) SYSTEM AND METHOD TO DISCOVER END NODE PHYSICAL CONNECTIVITY TO NETWORKING DEVICES

(75) Inventor: Pradeep J. Iyer, San Jose, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/305,149

(22) Filed: May 4, 1999

(51) Int. Cl.[7] .............................................. G06F 15/173
(52) U.S. Cl. ........................................ 709/223; 709/203
(58) Field of Search ................................. 370/389, 401, 370/516; 709/220, 239, 240, 203, 223, 242

(56) References Cited

U.S. PATENT DOCUMENTS

| | | | |
|---|---|---|---|
| 5,561,769 A | | 10/1996 | Kumar et al. ............... 709/202 |
| 5,675,741 A | | 10/1997 | Aggarwal et al. .......... 709/242 |
| 5,920,566 A | * | 7/1999 | Hendel et al. .............. 370/401 |
| 5,940,390 A | * | 8/1999 | Berl et al. .................. 370/389 |
| 6,044,081 A | * | 3/2000 | Bell et al. .................. 370/401 |
| 6,084,879 A | * | 7/2000 | Berl et al. .................. 370/389 |
| 6,084,892 A | * | 7/2000 | Benash et al. ............. 370/701 |
| 6,285,688 B1 | * | 9/2001 | Henderson et al. ......... 370/516 |

* cited by examiner

*Primary Examiner*—Glenton B. Burgess
*Assistant Examiner*—Walter Benson
(74) *Attorney, Agent, or Firm*—Blakely Sokoloff Taylor & Zafman LLP

(57) ABSTRACT

A server and method for determining physical connectivity between end nodes and networking devices within a network. With respect to one embodiment, the method comprises an initial act of establishing levels of priority for a plurality of link types capable of being established between networking devices and end nodes of a communication system. For example, as described herein, the types of links include an inferred link having a first level of priority, and other link types having a lesser priority. Once the priority levels are established, the method involves initially detecting a plurality of links associated with selected ports of the networking devices. After detection of these links, a determination is made from these links as to which links are associated with the end nodes and have the highest priority level. From that group, the physical connectivity between the end nodes and the networking devices is ascertained.

24 Claims, 10 Drawing Sheets

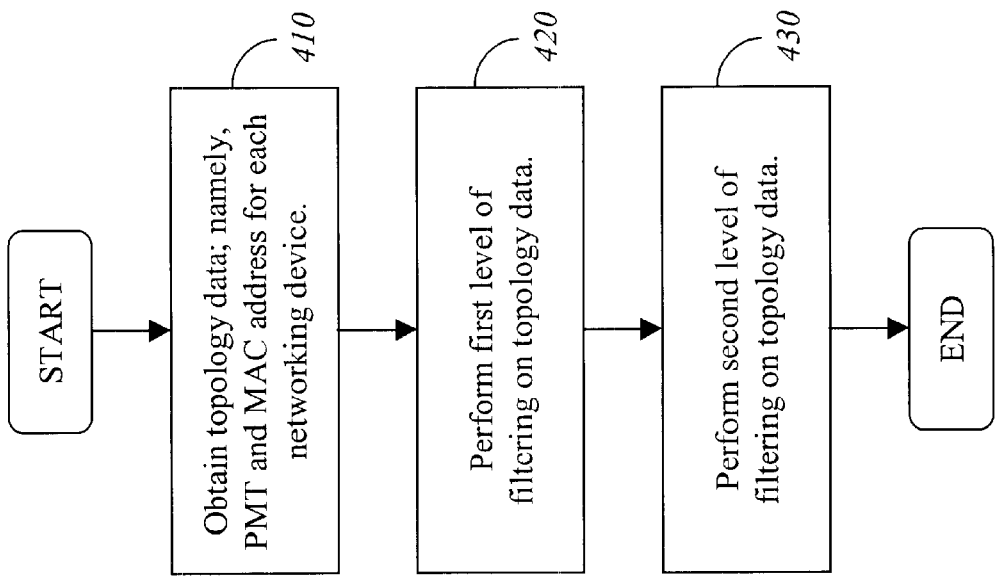

| END NODE | LINK TYPE | PORT |
|---|---|---|
| M1 | IL | P1 |
| M2 | IL | P2 |
| M3 | IL | P5 |

*Figure 6D*

| FIRST NETWORKING DEVICE 650 | P1: IL→M1 | P2: IL→M2 | P3: NDMAGL→M3 |
|---|---|---|---|
| SECOND NETWORKING DEVICE 660 | P4: NDMAGL→M1, M2 | P5: IL→M3 | P6: X |

*Figure 6C*

SYSTEM AND METHOD TO DISCOVER END NODE PHYSICAL CONNECTIVITY TO NETWORKING DEVICES

BACKGROUND

1. Field

The present invention relates to the field of data communications. In particular, this invention relates to an apparatus and method for determining physical connectivity between end nodes and networking devices within a network.

2. General Background

Over the last few years, personal and commercial usage of networking technology has increased dramatically. One type of network, referred to as the "Internet," is an enormous compilation of smaller networks connected together through networking devices (e.g., routers) that operate in accordance with a chosen protocol to provide uniform services across the network. The leading protocol is a two-core protocol commonly referred to as Transmission Control Protocol/Internet Protocol (TCP/IP). "TCP" is a connection-oriented transport service while "IP" is a connectionless-mode network service.

In general, networks are used to enable data communications between computers, workstations, servers and other types of end nodes. This is accomplished by physically connecting the end nodes to various networking devices of the network. A "physical connection" is a direct or indirect electrical, magnetic, or acoustic coupling between two hardware products to enable information to be transferred between these products. For identification purposes, each networking device is assigned a widely recognized media access control (MAC) address. Preferably, each MAC address is unique to avoid transmission errors.

Currently, a protocol called "Simple Network Management Protocol" (SNMP) is an operational mechanism for network management of TCP/IP-based networks. In accordance with SNMP, a network management server queues each networking device in order to retrieve data related to its interconnectivity with other networking devices. From that data, the network management server is capable of inferring the physical connectivity between networking devices. Unfortunately, this protocol is incapable of ascertaining the physical connections between end nodes and networking devices.

Hence, it would be advantageous to provide a system and method for determining the physical connectivity between end nodes and networking devices. This would provide more flexibility in troubleshooting the network from the perspective of the end node.

SUMMARY

Briefly, the present invention relates to a network management server and method for determining physical connectivity between end nodes and networking devices within a network. This provides additional capabilities that have not been supported by the conventional SNMP protocol. According to one embodiment, this physically connectivity is ascertained through successive operations. Initially, levels of priority are established for different link types between networking devices and end nodes of a communication system. For example, as described herein, the types of links in descending priority include (i) an inferred link, (ii) an end node media access control (MAC) address guess (ENMAG) link, and (iii) a networking device MAC address guess NDMAG) link.

Once the priority levels are established, address information resident or incoming to selected ports of the networking devices is detected to determine what links (if any) are associated with these ports. After detection of these links, a determination is made from these links as to which links are associated with the end nodes and have the highest priority level. From that group, the physical connectivity between the end nodes and the networking devices is ascertained.

BRIEF DESCRIPTION OF THE DRAWINGS

The features and advantages of the present invention will become apparent from the following detailed description of the present invention in which:

FIG. 4 is an embodiment of a flowchart including the general operations of the network management server of FIG. 2.

FIG. 6C is an illustrative embodiment of a list of physical connectivity between ports of the networking devices and the end nodes of FIG. 6A.

FIG. 6D is an illustrative embodiment of a filtered list of physical connections between each end node and the networking devices of FIG. 6A.

DETAILED DESCRIPTION OF AN EMBODIMENT

Embodiments of the present invention relate to a network and method for determining physical connectivity between end nodes and networking devices. Herein, in one embodiment, the determination of physical connectivity for end nodes is accomplished by (1) prioritizing the types of physical connections between end nodes and networking devices, and (2) eliminating redundant lower-priority physical connections associated with each end node based on a connection filtering technique described below.

Herein, certain terminology is used to describe various features of the present invention. In general, a "communication system" comprises one or more end nodes having physical connections to one or more networking devices of a network. More specifically, a "networking device" comprises hardware and/or software used to transfer information through a network. Examples of a networking device include a router, a switch, a repeater, or any other device that facilitates the forwarding of information. An "end node" normally comprises a combination of hardware and/or software that constitutes the source or destination of the information. Examples of an end node include a computer, printer, workstation, application server, set-top box and the like. "Information" generally comprises one or more signals having one or more bits of data, address, control or any combination thereof transmitted in accordance with any chosen packeting scheme.

A "link" is a connection between an end node and a networking device that supports the transmission or reception of information over a selected medium such as, for example, Plain Old Telephone System (POTS) lines, twisted pair, fiber optics, or wireless (e.g., satellite, radio frequency, etc.). Herein, three types of links are considered during analysis of the physical connectivity between end nodes and networking devices of the communication system. Of course, other link types may be considered without departing from the spirit and scope of the invention. Herein, the links are listed below in a descending order of priority:

(1) Inferred link—a direct physical connection between an end node to a port of a networking device. Only the MAC address from the end node is detected at the port of the networking device;

(2) End Node MAC Address Guess (ENMAG) link—an indirect physical connection between an end node and a port of a networking device. Multiple MAC addresses from at least two end nodes are detected at the port without any detection of a MAC address for a networking device; and (3) Networking Device MAC Address Guess (NDMAG) link—an indirect physical connection between an end node and a port of a networking device. One or more MAC addresses from end nodes along with at least one MAC address from a networking device are detected at the port.

Figure 1:
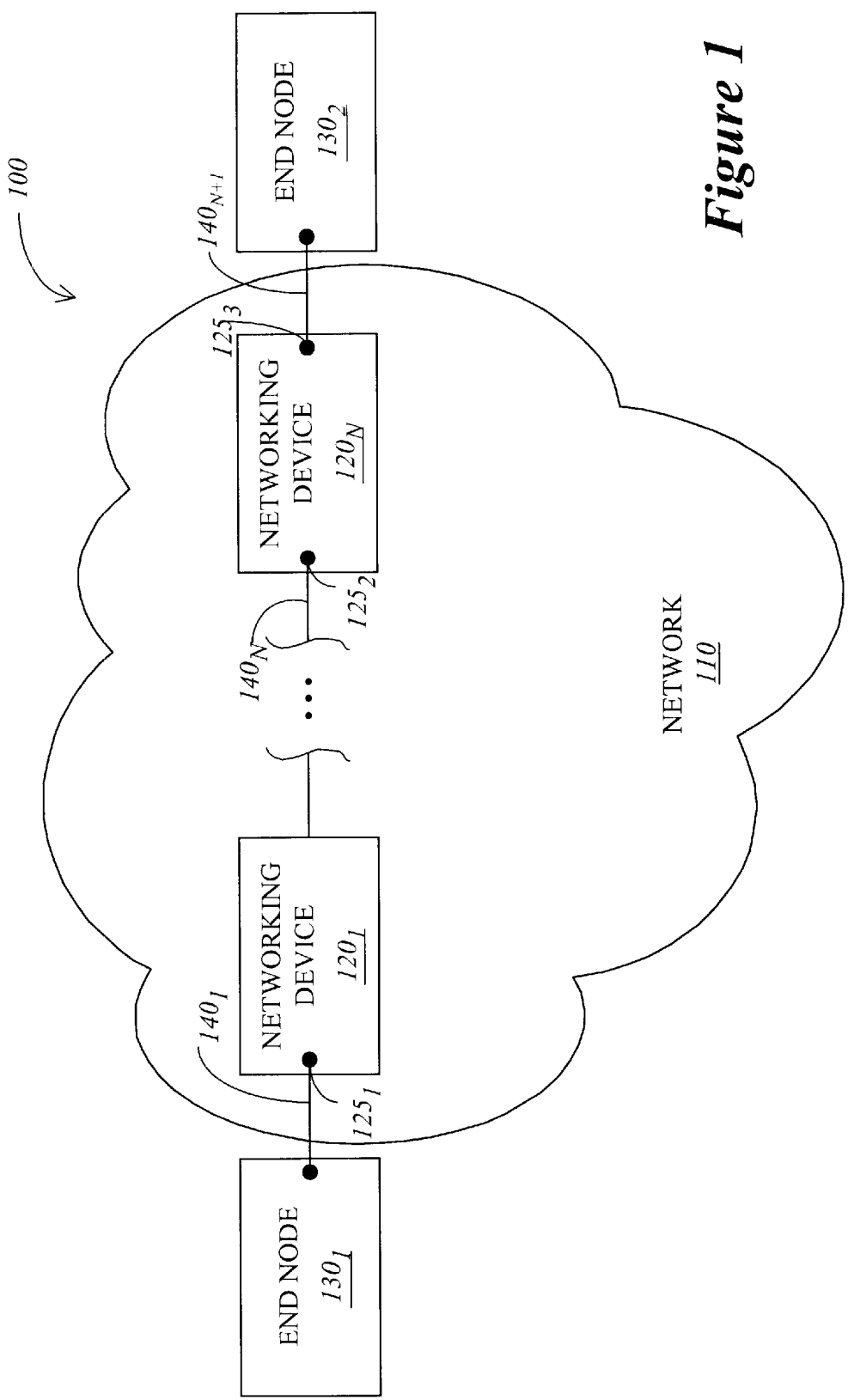
FIG. 1 is an embodiment of a network comprising an end node in communication with multiple networking devices.

Referring to FIG. 1, an embodiment of a communication system 100 comprising end nodes connected to a network 110 is shown. Herein, network 110 includes N networking devices $120_1$–$120_N$ (where "N" is a positive whole number, N >1). These networking devices $120_1$–$120_N$ are connected to a plurality of end nodes (e.g., end nodes $130_1$ and $130_2$). More specifically, end node $130_1$ is physically connected to both a first port $125_1$ of networking device $120_1$ via link $140_1$ and a first port $125_2$ of networking device $120_N$ via link $140_N$. Second end node $130_2$ (e.g., a network management server) is physically connected to a second port $125_3$ of networking device $120_N$ via link $140_{N+1}$.

Figure 2:
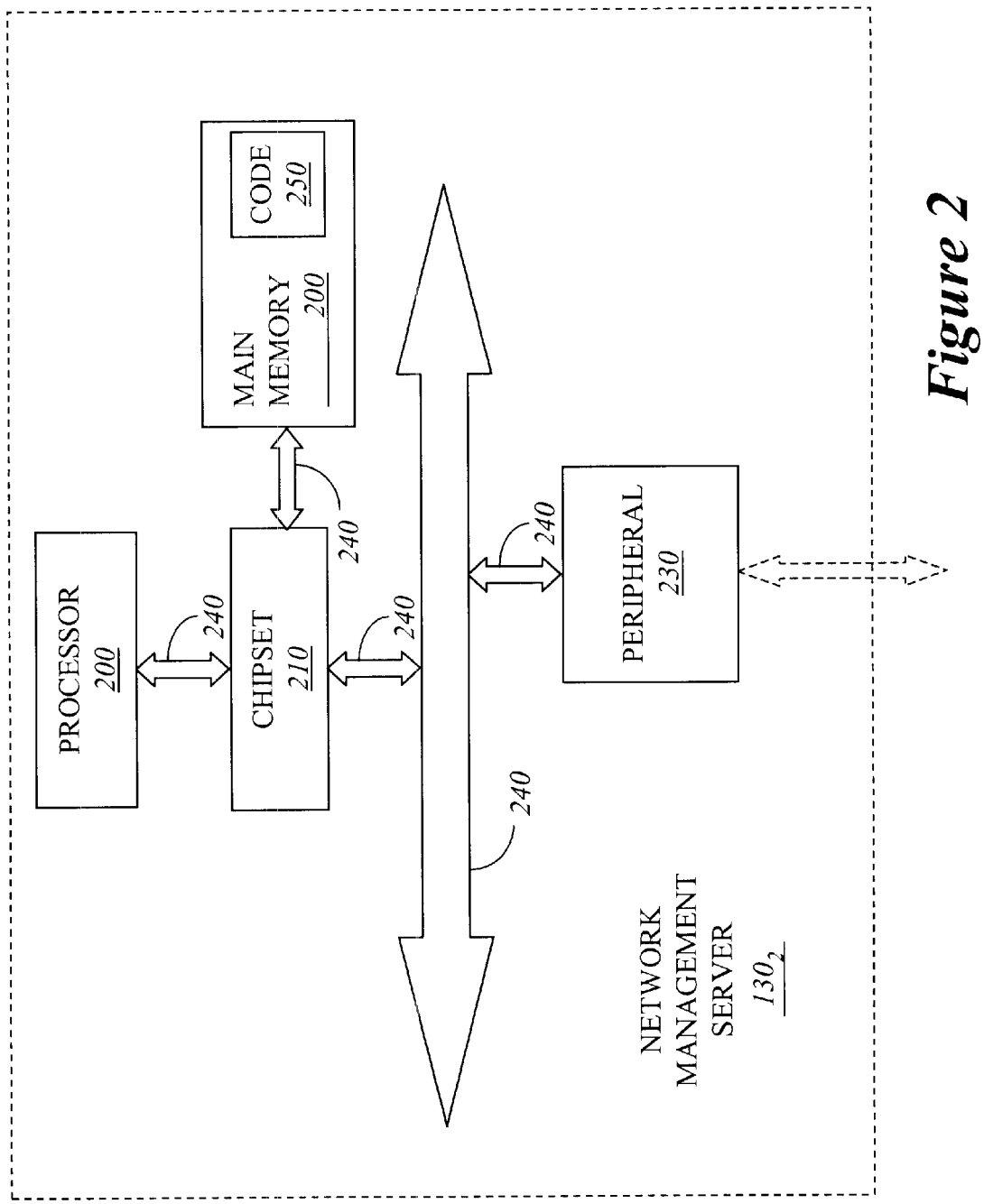
FIG. 2 is an embodiment of a network management server being an end node of FIG. 1 that utilizes the present invention.

Referring now to FIG. 2, an illustrative embodiment of end node $130_2$ operating as an network management server is shown. Network management server $130_2$ includes processor 200, a chipset 210, a main memory 220 and a peripheral 230 coupled together through buses 240. As shown, processor 200 includes one or more general purpose microprocessors, digital signal processors, micro-controllers or other logic having code processing capabilities. Prior to execution, code 250 (hereinafter referred to as "connectivity code") is fetched from peripheral 230 and is subsequently loaded into main memory 220. Examples of peripheral 230 include a local disk drive capable of retrieving connectivity code 250 from a readable medium (e.g., a hard disk, a compact disk, a digital video disk and the like). Other examples of peripheral 230 include a receiver (e.g., a modem, network interface card "NIC", satellite receiver, a set-top cable box receiver, etc.) to receive connectivity code 250 downloaded from a remotely located source (e.g., a web site).

Figure 3:
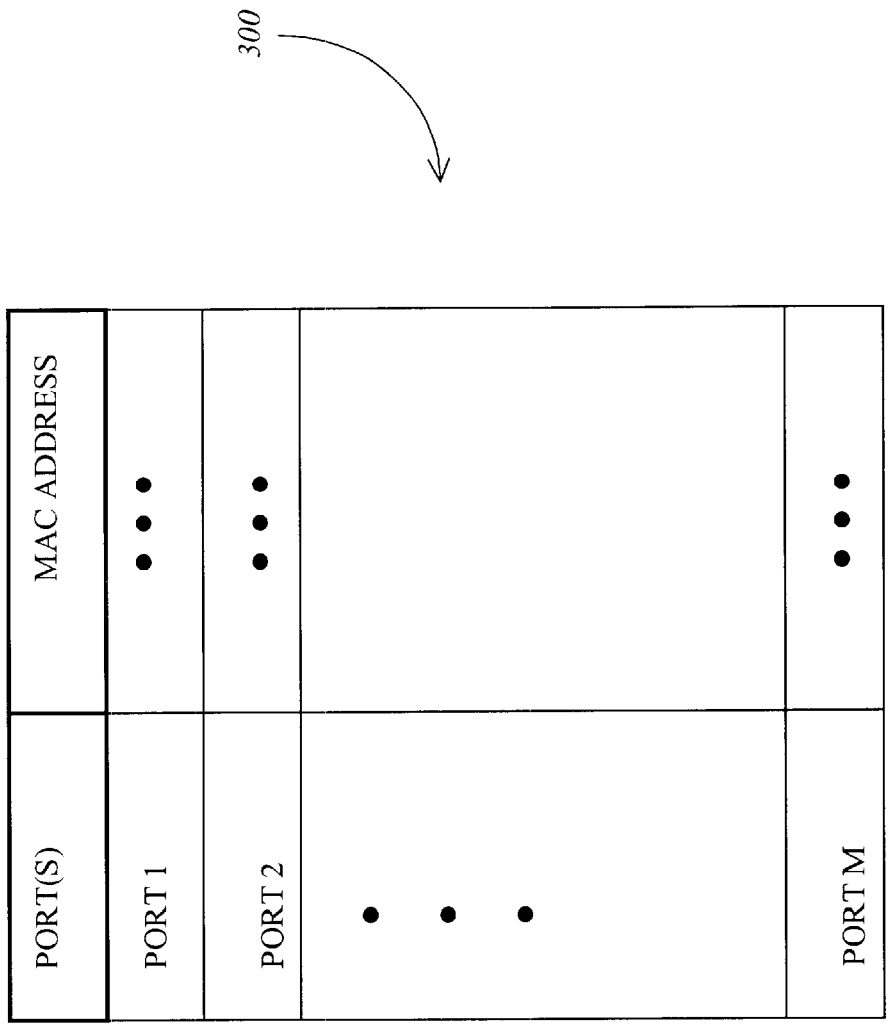
FIG. 3 is an embodiment of a port-to-MAC address table associated with a networking device of FIG. 1.

When certain sub-programs of connectivity code 250 are executed, network management server $130_2$ issues a query to networking devices $120_1$–$120_N$ of FIG. 1 in accordance with an application layer protocol referred to as "Simple Network Management Protocol Version 2.0" (SNMP v.2). In response to the query, each networking devices $120_1, \ldots, 120_N$ of FIG. 1 provides its own media access control (MAC) address and contents of its port-to-MAC address table (PMT). As shown in FIG. 3, PMT 300 is a table of all MAC addresses detected by ports of the networking device. This table is created and updated by snooping source MAC addresses from incoming packets. Based on the PMTs and MAC addresses provided by the networking devices, the physical connectivity between the end nodes and the networking devices may be determined as described in FIGS. 4, 5A and 5B.

Referring to FIG. 4, an embodiment of a flowchart including the general operations of the connectivity code upon execution by the network management server of FIG. 2 is shown. After the networking devices are located, the network management server obtains from each networking device (i) its port-to-MAC address table (PMT) and its own MAC address (block 410). The retrieval of topology data, namely PMTs and MAC addresses associated with each networking device, is accomplished through the use of SNMP v.2. In particular, the network management server may perform GET and/or GET-NEXT operations to retrieve information from each networking device. These operations are periodically prompted by a user of the network management server. Alternatively, the PMTs and MAC addresses may be received from trap operations performed by the networking devices to asynchronously report a change in its PMT or MAC address.

Once the incoming PMTs and MAC addresses are provided by the networking devices, the network management server executes additional sub-programs of connectivity code 250 (FIG. 2) to perform a connection filtering scheme. This scheme determines the physical connectivity between end nodes and networking devices of the communication system. In particular, this connection filtering scheme comprises a first level of filtering where links associated with each port of a networking device are ascertained based on the provided PMT and MAC address (block 420). Also, the connection filtering scheme comprises a second level of filtering where the highest priority links recovered from the first filtering level are determined for each end node (block 430). The combined operations of these levels of filtering determine the physical connectivity between the end nodes and the networking devices.

Figure 5A:
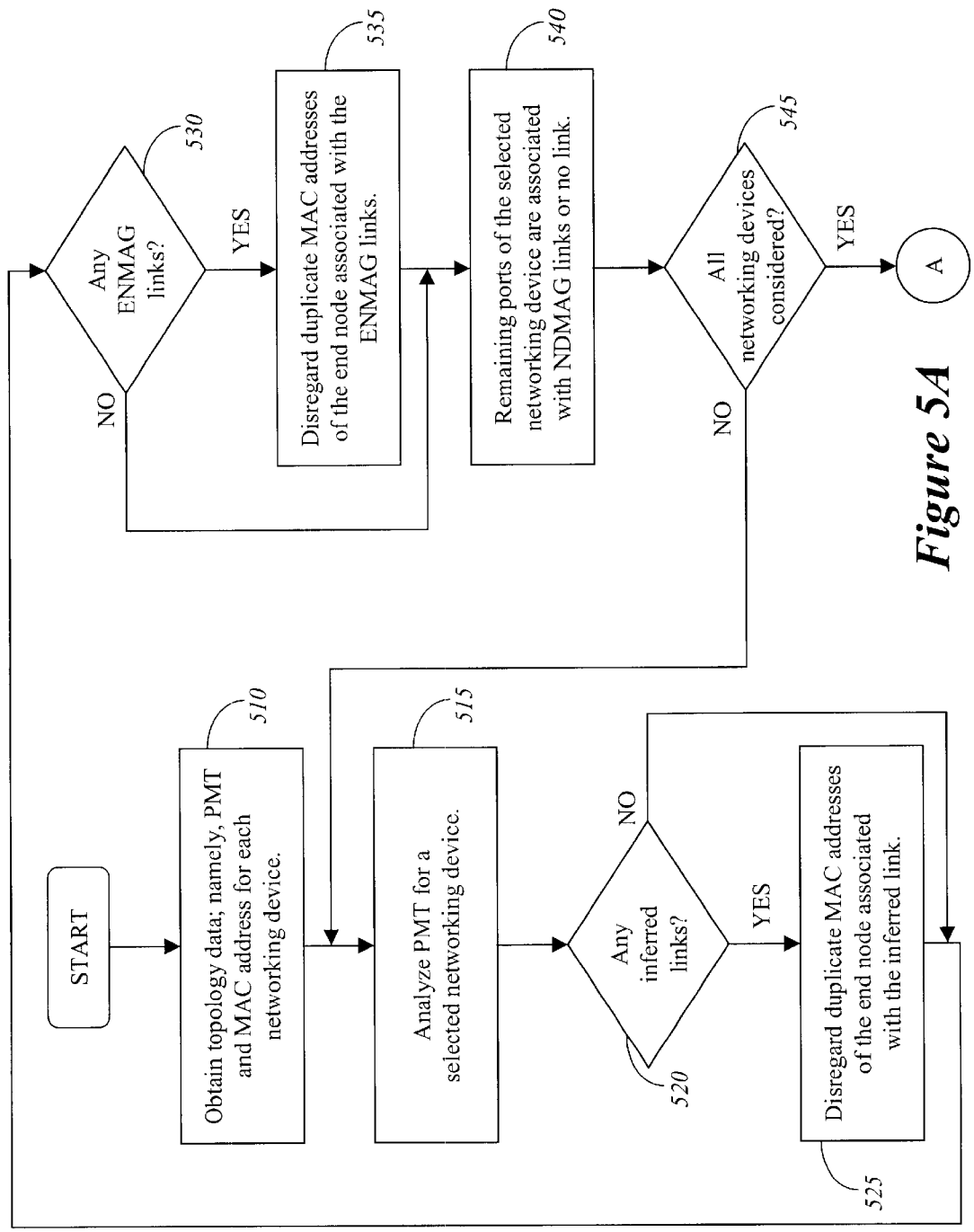
FIGS. 5A and 5B are an embodiment of a flowchart describing the filtering operations performed by the network management server of FIG. 2 in order to determine physical connectivity between the end nodes and networking devices of a network.
Figure 5B:
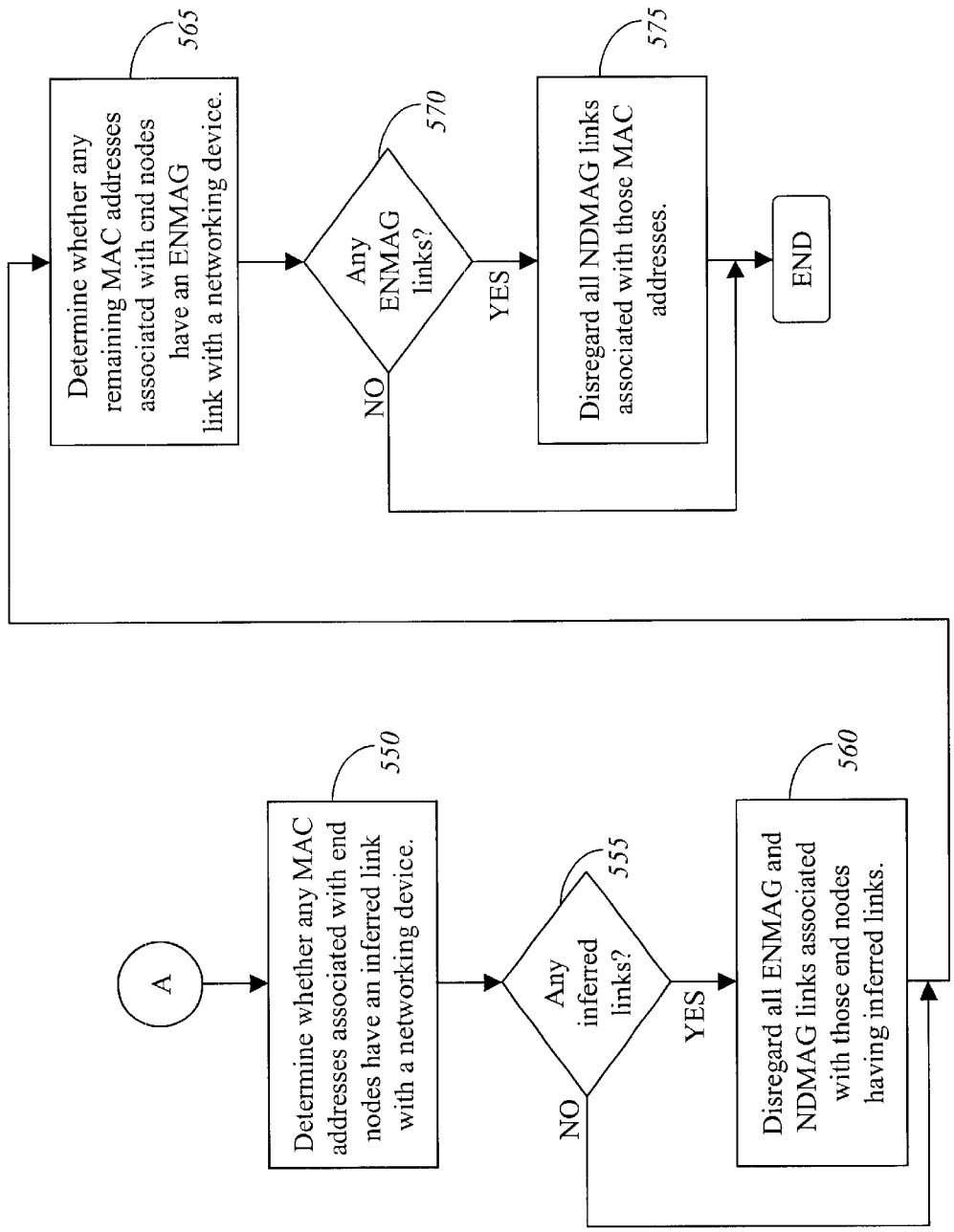

Referring now to FIGS. 5A and 5B, an embodiment of a flowchart describing operations, inclusive of the connection filtering scheme, performed by execution of sub-programs of connectivity code by the network management server is shown. Once the networking devices associated with the network are determined, the network management server obtains the PMT and MAC address from each networking device (block 510). Thereafter, the PMT of each networking device is analyzed in accordance with the levels of filtering described above.

More specifically, during the first filtering level of the connection filtering scheme, a PMT of a first networking device (referred to as "PMT1") is analyzed to determine whether there are any inferred links between a port of the first networking device and an end node (blocks 515 and 520). As described above, an "inferred link" constitutes a direct physical connection from the end node to the networking device. The network management server can detect an inferred link at a port by determining that only one MAC address of a particular end node was detected at that port. If an inferred link exists, duplicates of the MAC address associated with the particular end node are disregarded (possibly removed from PMT1 used in future computations). As a result, redundant lower priority links (e.g., ENMAG links or NDMAG links) between that particular end node and the first networking device are not considered (block 525).

Otherwise, after disregarding the duplicate MAC addresses or if no inferred links are established with the networking device, PMT1 is analyzed to determine whether there exist any ENMAG links between a port of the first networking device and an end node (block 530). As also described above, an "ENMAG link" constitutes an indirect physical connection from the end node to the networking device. The network management server can detect an ENMAG link at a port by determining that MAC addresses of two or more end nodes are detected at that port, and no MAC addresses associated with networking devices are detected. If an ENMAG link exists, duplicates of the MAC addresses associated with the particular end nodes are not considered or removed from PMT1 (block 535).

Otherwise, after disregarding the duplicate MAC addresses or no ENMAG links are made to an end node, any remaining ports of the first networking device that are in communication with the end node involve a NDMAG link as described above (block 540). Thus, the physical connections have been determined for a first networking device. Thereafter, this process is repeated by the network management server for other networking devices until all PMTs of the networking devices have been analyzed (block 545).

After all of the PMTs associated with the networking devices have been analyzed, a second filtering level of the connection filter scheme is performed. At this filtering level, each MAC address of the end nodes is analyzed to determine whether an inferred link exists between that end node and a port of a networking device (blocks 550 and 555). If so, all ENMAG links and NDMAG links associated with that MAC address are disregarded (block 560). Thereafter, the remaining MAC addresses are analyzed to determine whether an ENMAG link exists between an end node associated with the MAC address and a port of a networking device (blocks 565 and 570). If so, all NDMAG links associated with that MAC address are disregarded (block 575). The remaining MAC addresses for the end nodes are associated with NDMAG links.

Figures 6A, 6B:
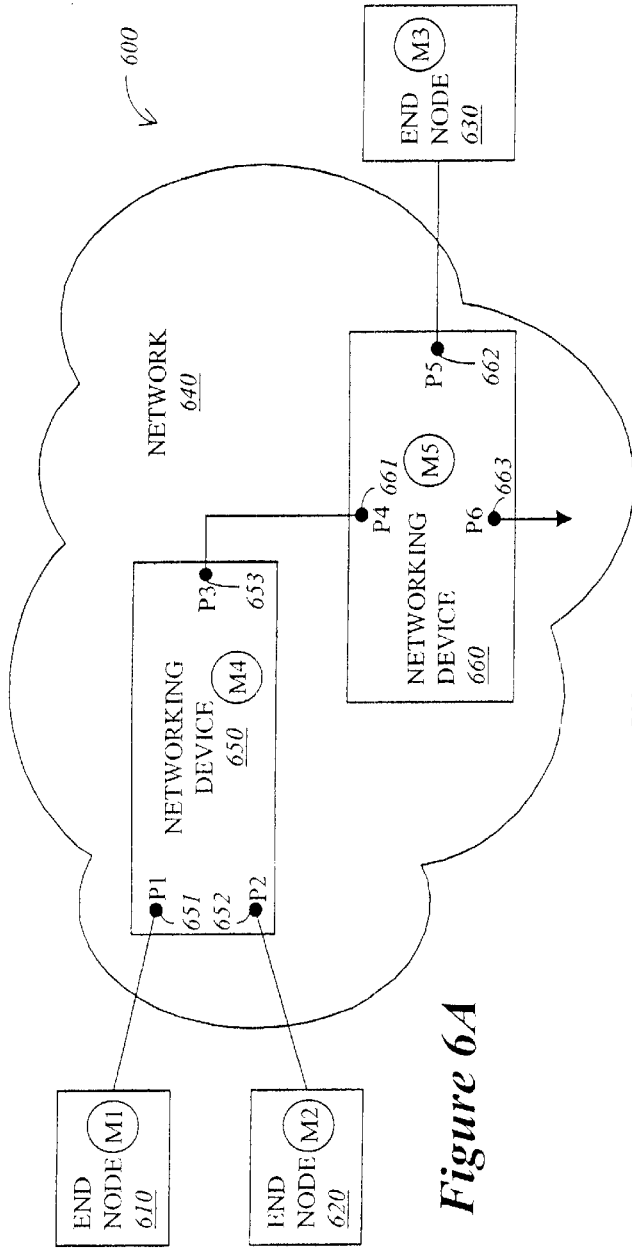
FIG. 6A is a first illustrative embodiment of a network utilizing the present invention.
FIG. 6B is an illustrative embodiment of a port-to-MAC address table maintained by each of the networking devices in the network of FIG. 6A.

Referring to FIGS. 6A–6D, a first illustrative embodiment of a communication system utilizing the present invention is shown. Herein, as shown in FIG. 6A, a communication system 600 comprises a plurality of end nodes 610, 620 and 630 connected to a network 640. These nodes 610, 620 and 630 are assigned MAC addresses M1, M2, and M3, respectively. A portion of network 640 includes networking devices 650 and 660, each assigned MAC addresses M4 and M5, respectively.

In particular, a first port (P1) 651 of networking device 650 is physically connected to end node 610. A second port (P2) 652 of networking device 650 is physically connected to a end node 620 while a third port (P3) 653 of networking device 650 is physically connected to a first port (P4) 661 of networking device 660. The second port (P5) 662 of networking device 660 is physically connected to end node 630 and a third port (P6) 663 of networking device 660 is connected to another networking device of network 640 (not shown).

As shown in FIG. 6B, the port-to-MAC address tables 700 maintained by each of the networking devices in communication system 600 of FIG. 6A are shown. A first port-to-MAC address table (PMT1) 710 includes a first column 711 identifying each port (P1, P2, P3) associated with networking device 650 and a second column 712 identifying the MAC addresses detected at these ports. For example, M1 is detected at P1 651 while M2 is detected at P2 652. M3 and M5 (and perhaps other MAC addresses associated with networking devices and end nodes connected to network 640) are detected at P3.

A second port-to-MAC address table (PMT2) 720 includes a first column 721 identifying each port (P4, P5, P6) associated with networking device 660 and a second column 722 identifying the MAC addresses detected at these ports. For example, M1, M2 and M4 are detected at P4 661 while M3 is detected at P5 662. Although not shown, MAC addresses associated with networking devices and end nodes connected to network 640 are detected at P6 663.

As shown in FIG. 6C, an illustrative embodiment of a result of a first level of filtering performed by the connection filter scheme is shown. With respect to networking device 650, an inferred link (IL) is ascertained between end node 610 and P1 651 because only the MAC address of end node 610 (M1) is detected. Likewise, an inferred link (IL) is determined to exist between end node 620 and P2 652 of networking device 650. At P3, a NDMAG link (NDMAGL) is determined to exist between end node 630 (M3) and networking device 650 because both M3 and M5 (the MAC address associated with networking device 660) are detected.

With respect to networking device 660, a NDMAG link (NDMAGL) is determined to exist between end nodes 610 and 620 because M1, M2 and M4 (the MAC address of networking device 650) are detected at P4. Also, an inferred link (IL) is ascertained between end node 630 and P5 662 because only the MAC address of end node 630 (M3) is detected. With respect to the P6, the type of link connected thereto is not determined for this illustrative embodiment.

As shown in FIG. 6D, an illustrative embodiment of a result of a second level of filtering performed by the connection filter scheme is shown. With respect to end node 610, an inferred link (IL) is ascertained with P1 651 of networking device 650. For second node 620, an inferred link (IL) is ascertained with P2 652 of networking device 650 while an inferred link (IL) is ascertained between end node 630 and P5 662 of networking device 660.

Figure 7A:
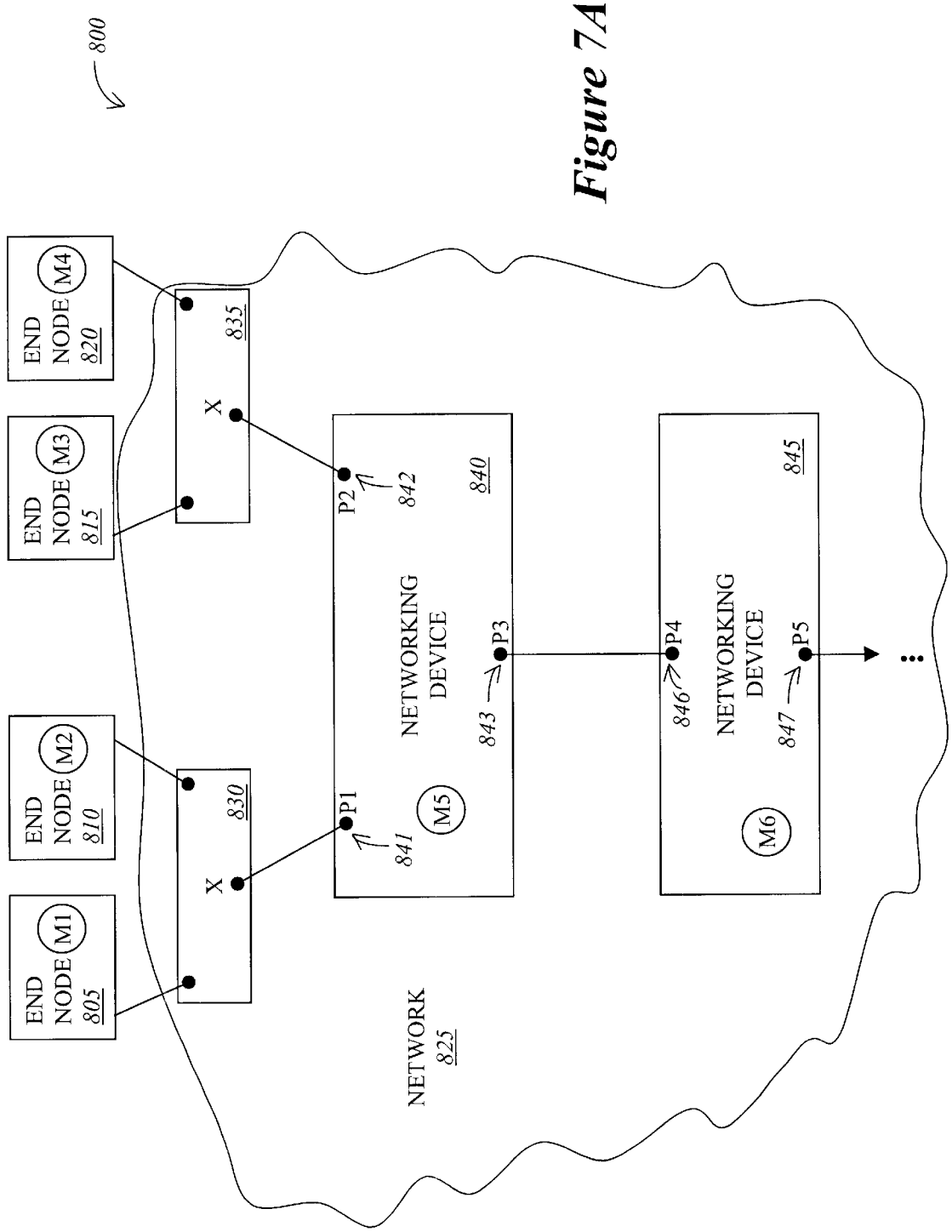
FIG. 7A is a second illustrative embodiment of a network utilizing the present invention.

Referring to FIGS. 7A–7D, a second illustrative embodiment of a communication system 800 utilizing the present invention is shown. Herein, as shown in FIG. 7A, a data communication network 800 comprises a plurality of end nodes 805, 810, 815 and 820 that are connected to a network 825. These end nodes 805, 810, 815 and 820 are assigned MAC addresses M1, M2, M3 and M4, respectively. A portion of network 825 includes networking devices 830, 835, 840 and 845 of which networking devices 830 and 835 are switches having no assigned MAC addresses. However, networking devices 840 and 845 are assigned MAC addresses M5 and M6, respectively.

In particular, switch 830 is connected to end nodes 805 and 810 as well as a first port (P1) 841 of networking device 840. Similarly, switch 835 is connected to end nodes 815 and 820 as well as a second port (P2) 842 of networking device 840. A third port (P3) 843 of networking device 840 is connected to a first port (P4) 846 of networking device 845.

Figures 7B, 7C, 7D:
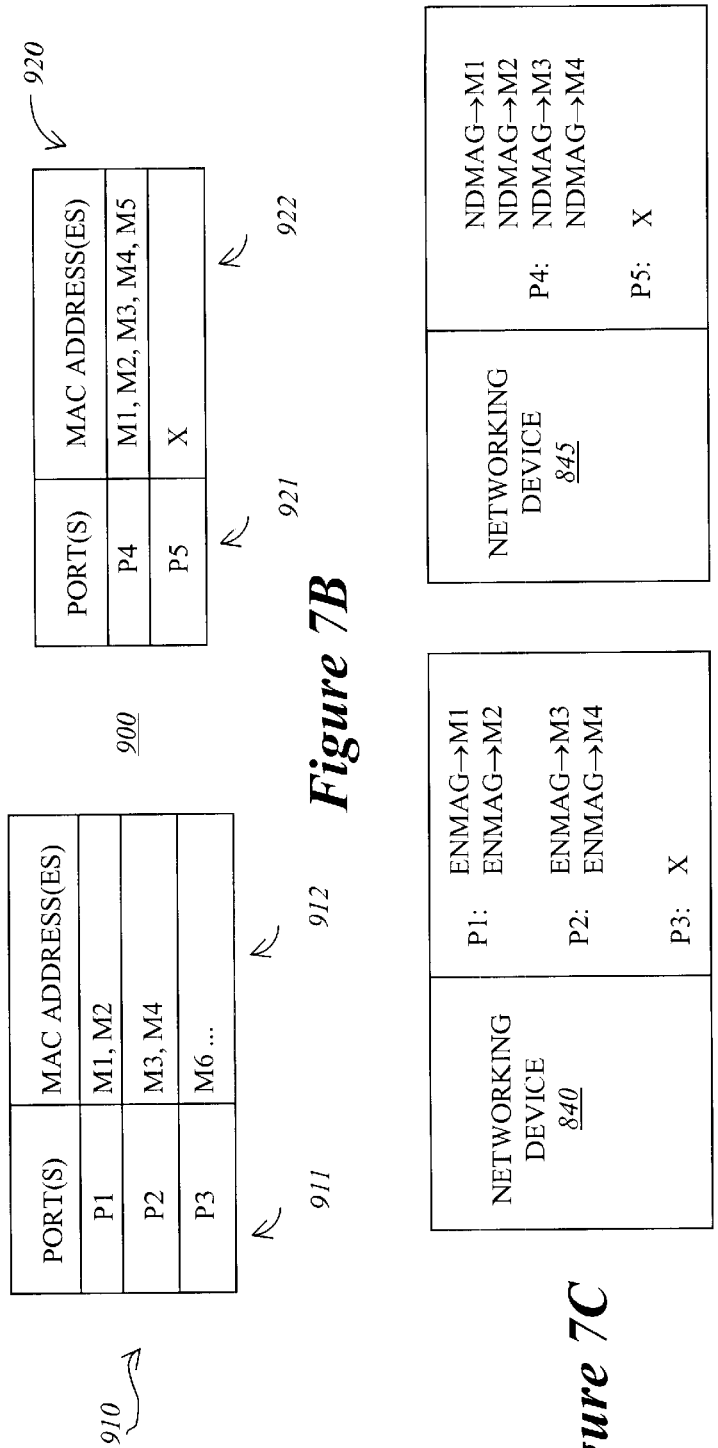
FIG. 7B is an illustrative embodiment of a port-to-MAC address table maintained by each of the networking devices in the network of FIG. 7A.
FIG. 7C is an illustrative embodiment of a list of physical and logical connectivity between ports of the networking devices and the end nodes of FIG. 7A.
FIG. 7D is an illustrative embodiment of a filtered list of physical connections between each end node and the networking devices of FIG. 7A.

As shown in FIG. 7B, the port-to-MAC address tables 900 maintained by each of the networking devices in communication system 800 of FIG. 7A are shown. A first port-to-MAC address table (PMT1) 910 includes a first column 911 identifying each port (P1, P2, P3) associated with networking device 840 and a second column 912 identifying the MAC addresses detected at these ports. For example, both M1 and M2 are detected at P1 841 of networking device 840. M3 and M4 are detected at P2 of networking device 840. At P3, M6 and other MAC addresses associated with networking devices and end nodes connected to network 825 are detected.

A second port-to-MAC address table (PMT2) 920 includes a first column 921 identifying ports P4 and P5 associated with networking device 845 and a second column 922 identifying the MAC addresses detected at these ports. For example, M1, M2, M3, M4 and M5 are detected at P4 846. The MAC address(es) detected at P5 is(are) not set forth in detail for clarity sake. It is foreseeable, however, that these MAC addresses would be associated with networking devices and end nodes connected to network 825 of FIG. 7A.

As shown in FIG. 7C, an illustrative embodiment of a result of a first level of filtering performed by the connection filter scheme is shown. With respect to networking device 840, an ENMAG link is ascertained at P1 841 because MAC addresses of both end nodes 805 and 810 (M1, M2) are detected. Likewise, an ENMAG link is ascertained at P2 842 because MAC addresses of both end nodes 815 and 820 (M3, M4) are detected. At P4 846 of networking device 845, a NDMAG link is determined to exist between end nodes 805, 810, 815 and 820 because M1–M4 and M5 (the MAC address associated with networking device 840) are detected.

As shown in FIG. 7D, an illustrative embodiment of a result of a second level of filtering performed by the connection filter scheme is shown. With respect to end nodes 805, 810, 815 and 820, each is associated with an ENMAG link at ports P1, P1, P2 and P2, respectively. The reason is that there does not exist any inferred links to end nodes 805, 810, 815 and 820 due to the switch arrangement. Instead, the highest priority links associated with end nodes 805, 810, 815 and 820 are ENMAG links.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for determining physical connectivity between end nodes and networking devices of a communication system, comprising:

ascertaining a plurality of links associated with the end nodes and ports of the networking devices, the plurality of links comprised of a plurality of link types including an inferred link type for identifying a direct physical connection between at least one of the end nodes and at least one of the ports of the networking device, an End Node Media Access control Address Guess (ENMAG) link type, comprising an end node MAC address, and a Networking Device Media Access control Address Guess (NDMAG) link type comprising a network device MAC address;

prioritizing the plurality of link types with the inferred link having a first level of priority, the ENMAG link having a second level of priority less than the first level of priority, and the NDMAG link having a lesser priority level than both the first level of priority and the second level of priority; and ascertaining a link having a highest priority level for each of the end nodes.

2. The method of claim 1, wherein the act of ascertaining the plurality of links comprises analyzing data from a first networking device of the networking devices, the data includes media access control addresses detected at selected ports of the first networking device.

3. The method of claim 2, wherein the act of ascertaining the plurality of links further comprises:

determining whether a first type of link is present between a first port of the first networking device and a first end node of the end nodes; and disregarding other links having a lower priority than the first link type between the first port of the first networking device and the first end node if the first link type is present.

4. The method of claim 3, wherein the act of determining whether the first type of link is present comprises:

determining that only a media access control (MAC) address of the first end node is detected at the first port of the first networking device.

5. The method of claim 3, wherein the act of ascertaining the plurality of links further comprises:

determining whether a second type of link is present between the first port of the first networking device and the first end node; and disregarding other links having a lower priority than the first link type and the second link type between the first port of the first networking device and the first end node if the second link type is present.

6. The method of claim 5, wherein the act of determining whether the second type of link is present comprises:

determining that a plurality of media access control (MAC) addresses associated with the first end node and a second end node of the end nodes are detected at the first port of the first networking device and no MAC address associated with a second networking device of the networking devices is detected at the first port.

7. The method of claim 5, wherein the act of ascertaining the plurality of links further comprises:

determining whether a third type of link is present between the first port of the first networking device and the first end node.

8. The method of claim 7, wherein the act of determining whether the third type of link is present comprises:

determining whether a media access control (MAC) address associated with a second networking device of the networking devices is at the first port of the first networking device.

9. The method of claim 1, wherein the ascertaining of the link having the highest priority level comprises:

determining all links associated with the first end node of the end nodes;

determining whether the inferred link is present between the first end node and any ports of the networking devices; and disregarding a remainder of ENMAG and NDMAG links associated with the first end node if the inferred link is present.

10. The method of claim 9, wherein the ascertaining of the link having the highest priority further comprises:
- determining whether the ENMAG link is present between the first end node and any ports of the networking devices; and
- disregarding the remainder of the NDMAG links associated with the first end node if the ENMAG link is present.

11. A method comprising:
- establishing levels of priority for a plurality of link types capable of being established between networking devices and end nodes, the plurality of link types including an inferred link type for identifying a direct physical connection between at least one of the end nodes and at least one of the ports of the networking device, the inferred link type having a first level of priority, an End Node Media Access control Address Guess (ENMAG) link type comprising an end node MAC address and having a second level of priority less than the inferred link type, and a Network Device Media Access control Address Guess (NDMAG) link type comprising a network device MAC address and having a lesser priority level than both the inferred and ENMAG link types;
- detecting a plurality of links associated with selected ports of the networking devices; and
- determining a link from the plurality of links having a highest priority level for each of the end nodes.

12. A machine readable medium having embodied thereon a computer program processed by a network management server, comprising:
- a first sub-program to detect physical connections between selected ports of a first networking device and at least one end node;
- a second subprogram to ascertain at least one physical connection associated with the at least one end node and having a highest priority level; and
- wherein the computer program is coded with a specified priority scheme for a plurality of types of physical connections, including (i) an inferred link type for identifying a direct physical connection between at least one of the end nodes and at least one of the ports of the networking device (2) an end node media access control address guess (ENMAG) link comprising an end node MAC address and (3) a networking device media access control address guess (NDMAG) link comprising a networking device MAC address with the inferred link having a first level of priority, the ENMAG link having a second level of priority less than the first level of priority, and the NDMAG link having a lesser priority level than both the first level of priority and the second level of priority.

13. The machine readable medium of claim 12, wherein the first sub-program further coded to analyze data from the first networking device, the data includes media access control addresses detected at the selected ports of the first networking device.

14. The machine readable medium of claim 13, wherein the first sub-program further coded to (i) determine whether a first type of physical connection is present between a first port of the first networking device and a first end node of the end nodes, and if the first type of physical connection is present (ii) to disregard other physical connections associated with the first port of the networking device and the first end node that have a lower priority than the first connection type.

15. The machine readable medium of claim 14, wherein the first sub-program determines whether the first type of physical connection is present by determining that only a media access control (MAC) address of the first end node is detected at the first port of the first networking device.

16. The machine readable medium of claim 14, wherein the first sub-program further coded to (i) determine whether a second type of physical connection is present between the first port of the first networking device and the first end node of the end nodes, and if the second type of physical connection is present (ii) to disregard other physical connections associated with the first port of the networking device and the first end node that have a lower priority than both the first connection type and the second connection type.

17. The machine readable medium of claim 16, wherein the first sub-program determines whether the second type of physical connection is present by determining that a plurality of media access control (MAC) addresses associated with the first end node and a second end node are detected at the first port of the first networking device and no MAC address associated with a second networking device is detected at the first port.

18. A network management server to be implemented within a network having end nodes and networking devices, a network management server comprising:
- a processor; and
- a main memory to contain code that, when in operation, determines physical connectivity between an end node and a networking device; and wherein the code includes a specified priority scheme for a plurality of types of physical connections, including (i) an inferred link type for identifying a direct physical connection between at least one of the end nodes and at least one of the ports of the networking device (2) an end node media access control address guess (ENMAG) lint comprising an end node MAC address and (3) a networking device media access control address guess (NDMAG) link comprising a networking device MAC address, with the inferred link having a first level of priority, the ENMAG link having a second level of priority less than the first level of priority, and the NDMAG link having a lesser priority level than both the first level of priority and the second level of priority.

19. The network management server of claim 18 further comprising:
- a peripheral device to receive the code downloaded from a remotely located source.

20. A data signal embodied in a stream of digital information comprising:
- a first source code to detect physical connections between selected ports of a fist networking device and at least one end node, wherein the first source code includes a specified priority scheme for a plurality of types of physical connections, including (i) an inferred link type for identifying a direct physical connection between at least one of the end nodes and at least one of the ports of the networking device (2) an end node media access control address guess (ENMAG) link comprising an end node MAC address and (3) a networking device media access control address guess (NDMAG) link comprising a networking device MAC address, with the inferred link having a first level of priority, the ENMAG link having a second level of priority less than the first level of priority, and the NDMAG link having a lesser priority level than both the first level of priority and the second level of priority; and a second source code to ascertain at least one physical connection that is associated with the at least one end node and has a highest priority level.

21. The data signal of claim 20, wherein the first source code including code to analyze information from the first networking device, the data includes media access control addresses detected at the selected ports of the first networking device.

22. The data signal of claim 21, wherein the first source code further includes code to determine whether a first type of physical connection is present between a first port of the first networking device and a first end node of the at least one end node, and if the first type of physical connection is present (ii) to disregard other physical connections associated with the first port of the networking device and the first end node that have a lower priority than the first type of physical connection.

23. The data signal of claim 22, wherein the first source code determines whether the first type of physical connection is present by determining that only a media access control (MAC) address of the first end node is detected at the first port of the first networking device.

24. The data signal of claim 22, wherein the first source code further includes code (i) to determine whether a second type of physical connection, having a lower priority than the first connection type, is present between the first port of the first networking device and the first end node of the end nodes, and if the second type of physical connection is present (ii) to disregard other types of physical connections associated with the first port of the networking device and the first end node that have a lower priority than both the first and second types of physical connections.

* * * * *

UNITED STATES PATENT AND TRADEMARK OFFICE
CERTIFICATE OF CORRECTION

PATENT NO. : 6,397,248 B1
DATED : May 28, 2002
INVENTOR(S) : Iyer

It is certified that error appears in the above-identified patent and that said Letters Patent is hereby corrected as shown below:

Column 9,
Line 35, please delete "subprogram" and insert -- sub-program --.

Column 10,
Line 36, please delete "lint" and insert -- link --.

Column 11,
Line 10, after "includes code" please insert -- (i) --.

Signed and Sealed this

Fourth Day of May, 2004

JON W. DUDAS
*Acting Director of the United States Patent and Trademark Office*